United States Patent [19]

Eickmann

[11] Patent Number: 4,701,113
[45] Date of Patent: Oct. 20, 1987

[54] PUMP ARRANGEMENT WHICH INCLUDES A WORKING CHAMBER WHICH IS BORDERED BY A CONED RING WITH A SEAL LIP ON THE INNER FACE OF THE CONED RING

[76] Inventor: Karl Eickmann, 2420 Isshiki, Hayama-machi, Kanagawa-ken, Japan

[21] Appl. No.: 788,174

[22] Filed: Oct. 16, 1985

Related U.S. Application Data

[63] Continuation-in-part of Ser. No. 282,990, Jul. 14, 1981, Pat. No. 4,557,347, and a continuation-in-part of Ser. No. 387,567, Jun. 11, 1982, Pat. No. 4,569,630.

[51] Int. Cl.$^4$ .................. F04B 43/00; F01B 19/00
[52] U.S. Cl. .................................... 417/472; 92/45; 92/102
[58] Field of Search ............... 92/45, 249, 42, 46–48, 92/98 R, 102; 917/472, 473, 392, 394

[56] References Cited

U.S. PATENT DOCUMENTS

| | | | |
|---|---|---|---|
| 1,190,716 | 7/1916 | Bowmann | 92/45 |
| 2,889,781 | 6/1959 | Thompson | 92/45 |
| 3,074,351 | 1/1963 | Foster | 417/393 |
| 3,134,508 | 5/1964 | Bayer et al. | 417/394 |
| 3,176,595 | 4/1965 | Schwartz | 92/249 |
| 3,913,460 | 10/1975 | Wright | 92/249 |

FOREIGN PATENT DOCUMENTS

| | | | |
|---|---|---|---|
| 3226069 | 4/1983 | Fed. Rep. of Germany | 417/273 |
| 4947 | 3/1915 | United Kingdom | 417/472 |
| 437980 | 11/1935 | United Kingdom | 417/392 |

Primary Examiner—Carlton R. Croyle
Assistant Examiner—Paul F. Neils

[57] ABSTRACT

In the European patent application publication EP OS No. 0 102 441 a high pressure pump is shown which uses tapered rings (disc spring derivatives) which are clamped together as a pump chamber. The clamping rings required cutting into sections which is expensive and time consuming. The present discoverings now show that the friction at compression of the coned rings was very large. The present invention now discovers that radially flexible ring portions should be provided to the coned ring portions in order to eliminate the friction and to reduce the time and cost of the production of the pump arrangement.

2 Claims, 12 Drawing Figures

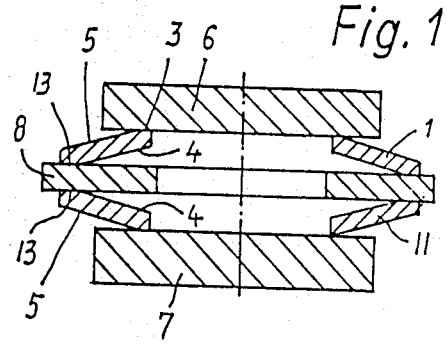
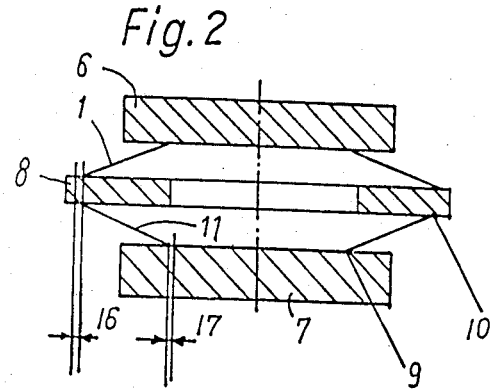
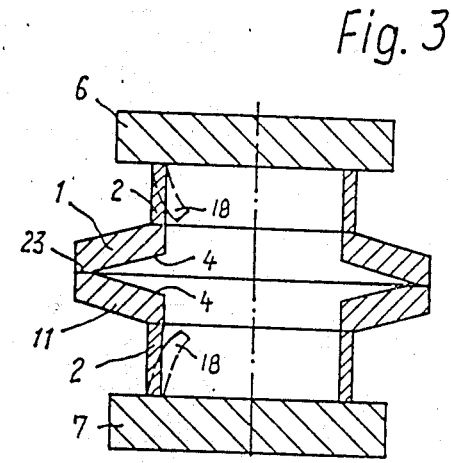
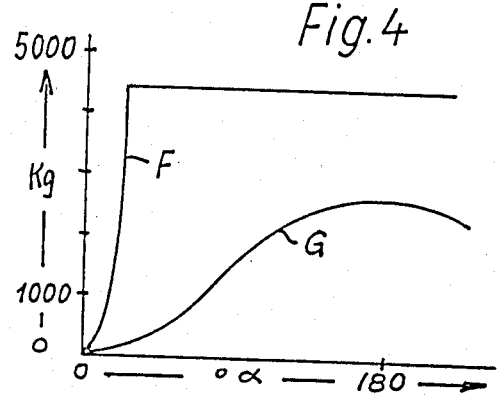
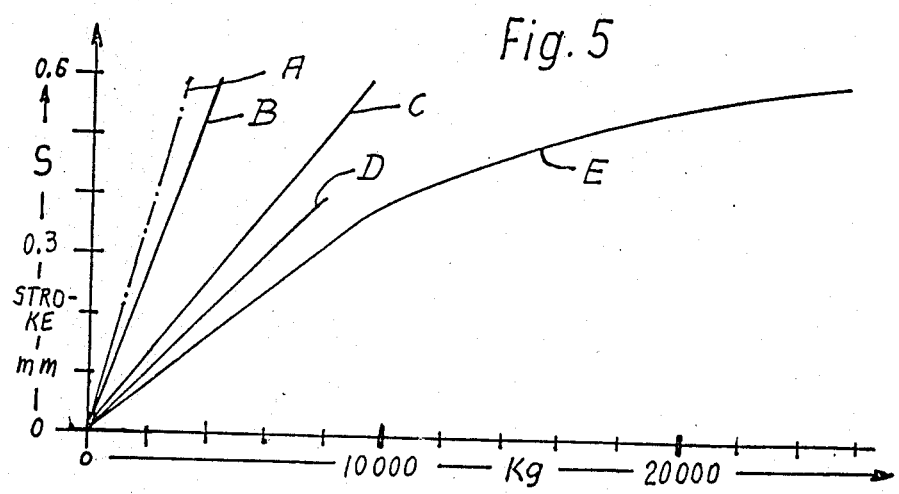

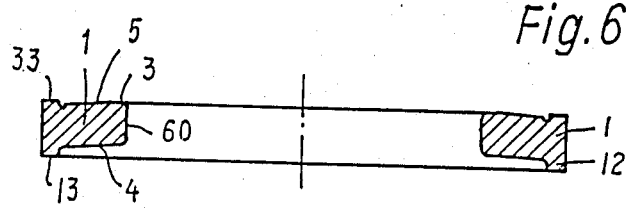
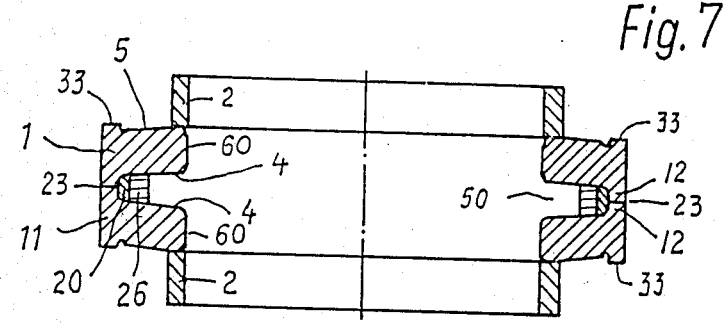
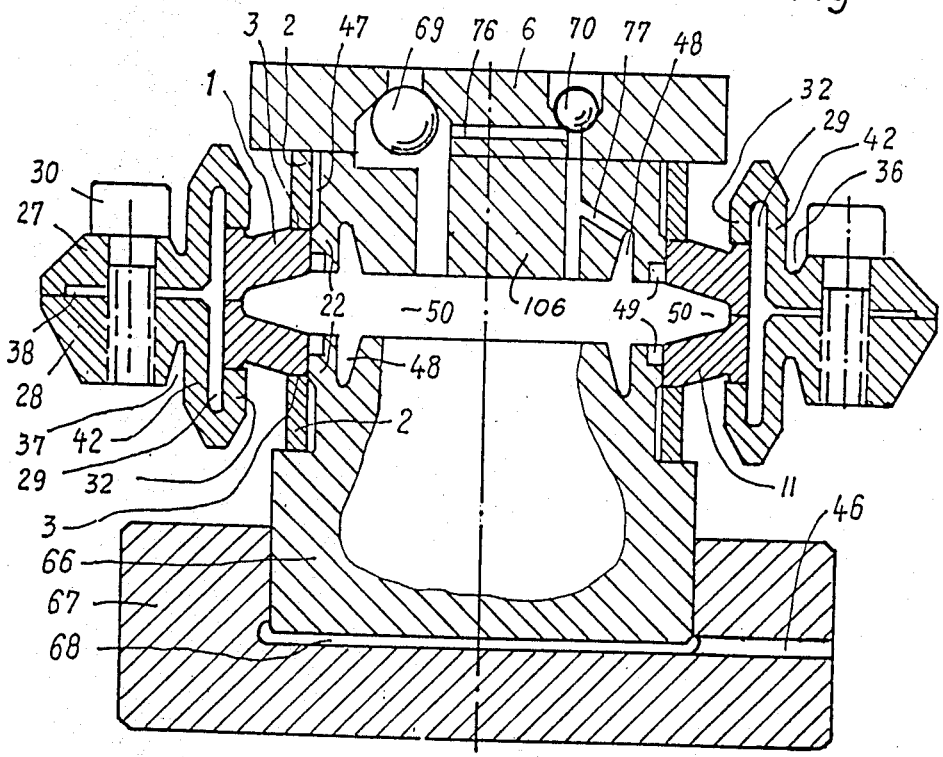

PUMP ARRANGEMENT WHICH INCLUDES A WORKING CHAMBER WHICH IS BORDERED BY A CONED RING WITH A SEAL LIP ON THE INNER FACE OF THE CONED RING

This is a continuation in part application of my applications Ser. No. 282,990 filed 07-14-81 and of Ser. No. 387,567 filed June 11, 1982, whereof application No. 387,567 issued as U.S. Pat. No. 4,569,630 on Feb. 11, 1986 and application Ser. No. 282,990 issued as U.S. Pat. No. 4,557,347 on Dec. 10, 1985.

DESCRIPTION OF THE FORMER ART

The mentioed European patent application publication corresponds in principle or at least partially to BRD (West German) DE OS No. 32 26 069; East German Pat. No. 207,403 or Japan patent publication No. Sho 58-34247.

This literature provides examples for pumps and motors including the arrangements which belong to a pump or motor which uses the coned ring portions. The literature also provides exact methods of calculation and designs of the technologies which are involved. However, the clamping rings are too complicated, too expensive, too time consuming in production and the elements provide large friction at their bearing portions, whereby the efficiencies and powers of the devices of the former art are reduced. Other, older, former art is not able to produce high pressures of many hundred or a few thousand atmospheres.

BRIEF DESCRIPTION OF THE DRAWINGS

FIGS. 1 to 3 show sectional arrangements through geometric and mathematic arrangements for explanations.

FIGS. 4 and 5 show diagrams.

FIGS. 6 to 12 show sectional arrangements through portions of embodiments of pumping arrangements of the invention or of portions or parts thereof.

DESCRIPTION OF THE PREFERRED EMBODIMENTS

Figure 9:
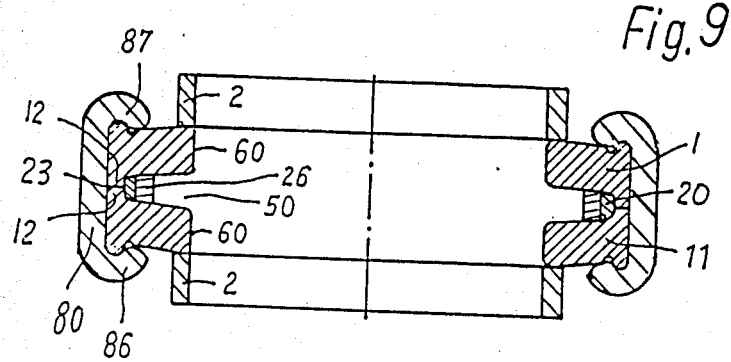

In FIG. 1 tapered rings 1,11 with axial inner faces 4 and axial outer faces 5 are provided symmetrically arranged on a medial plane ring 8 and they are sandwiched between covers 6 and 7. The radial inner ends of the coned rings meet the covers at 3 to be borne on the covers by local portions 3. The radial outer ends of the coned rings are borne on the medial plane ring 8 by local portions 13. When the covers 6 and 7 are pressed together, the springs or coned rings 1,11 compress axially and the space between them can be used to pump a fluid by the compression of the space 4,50 between the symmetrically arranged coned rings 1,11. The coned rings 1,11 may also be called springs or disc springs, but they are in the invention commonly called "pumping elements" or "elements".

In FIG. 2 the elements 1,11 are replaced by thin straight lines 1 and 11. When the plates 6 and 7 are pressed towards each other, according to the present invention, the local place 13 moves to the left, radially outwards, by distance 16 and the local place 3 moves to the right, radially inwards, by distance 17 in FIG. 2. The movements of radial lengths 16 and 17 of FIG. 2 occur under very high pressure and cause a large friction. Also, the lengths of movements 16 and 17 are very small and often only hundredths or tenths of a millimeter, the loads at local portions 3 and 13 between the elements 1,11 and ring 8 or cover 6 and 7 are very high, for example, multiples of tenthousands of a kilogram if the pressures in the chambers below the insides 4 of the elements 1,11 are some thousand atmospheres. This high load causes, as the invention discovers, very large friction. The friction becomes so large that several thousand or more Kilograms are needed to compress the elements 1,11, which for compression without such friction would require only the force "A" of FIG. 5. In actuality, due to the mentioned large friction, the required force was measured in an example of the device as shown by "E" in FIG. 5.

FIG. 5 thereby explains the forces in a schematic diagram which act on elements 1,11 and on the therefrom improved elements of the present invention.

FIG. 3 explains, how, some of the mentioned friction can be reduced or be entirely prevented. The distance ring portions 2 are placed in FIG. 3 between the elements 1,11 and the covers 6 and 7 at the local portions 3. When now the elements 1,11 are compressed, the inner ends of the rings 2 follow the movement 17 of FIG. 2 and eliminate all friction at local portions 3 of FIG. 1. The rings 2 are now in themselves partially radially deflecting springs which accumulate energy of inner stresses to be used later at the expansion strokes of the elements 1,11. The friction of the arrangement of FIG. 1 became thereby reduced to values "C" and "D" of FIG. 5, with different values "C" and "D" for different diameters and lengths of rings 2 of FIG. 3.

FIG. 6 shows the element 1 of the invention, which obtained the best reduction of the mentioned friction.

FIG. 7 shows two of the elements of FIG. 6 arranged symmetrically and provided with the rings 2 of FIG. 3. The best efficiency and reduction of friction was obtained with the present invention by FIG. 7 and the result is shown by "B" in FIG. 5. Therefrom it can be seen that the invention eliminated roughly 90 percent of the friction of FIG. 1, shown by "E" in FIG. 5 and the actual force to compress the elements 1,11 is now, by the use of the present invention, close to the theoretical compression force due to internal stresses in the elements 1,11 as shown by "A" in FIG. 5. Values "A" and "B" are now close together.

In FIG. 4 it is explained that it was tried by the invention to keep the local portions 13 of FIG. 1 on medial plane ring 8 and to expand the medial ring 8 equal and at equal time with the local expansion 16 of the elements 1,11. This, the invention discovers, would have eliminated the friction at local portions 13 if it would have worked. According to the invention, however, it can not work, namely, the expansion at equal time can not work, because the pressure in the fluid increases over the rotary angle "alpha" of the cam drive for the compression of the elements 1,11 by the drive piston along curve "F" of FIG. 4, while the radial expansion of local portions 13 occurs along curve "G" of FIG. 4. Since curves "F" and "G" are unequal, they show a different movement at different time, and, consequently, the medial ring 8 of FIG. 1 will never expand equally and at equal time with the movement 16 of local portions 13 of FIGS. 1 and 2.

FIGS. 6 and 7 now illustrate that the invention has made use of this rediscovery and provided a novel element 1 which does not need and not use the medial plane ring 8 in order to eliminate by the invention of element(s) 1,11 of FIGS. 6 and 7 the friction on the former medial plane ring 8 which in the mentioned former art was called "the outer ring". According to the invention, element 1 is now provided on its radial outer end with an axially inwardly extending portion 12 which has the local bearing face 13. FIG. 7 shows that a centering ring 20 is inserted radially inwardly of the axially extending portions 12 of a pair of symmetrically arranged elements 1 and 11 to center the mentioned elements around a common axis. The elements now meet each other directly at bearings 23 which are the bearing faces 13 of the elements 1 and 11. If this arrangement becomes axially compressed between covers 6 and 7, as in FIG. 1, the meeting and bearing face arrangement 13,23, now expands equally at equal times by the radial length 16 of FIG. 2 and all the friction of movement 16 along the former ring 8 is now completely eliminated. Radially inwards of the centering ring 20, which meets the inner faces of portions 12 and keeps them aligned, a plasticly deformable seal ring (O-ring, gum-ring, teflon ring) 26 is inserted to prevent escape of leakage out from the internal pumping or 50 between the axial inner faces 4 of the symmetrically arranged elements 1 and 11 of the type of FIG. 6. The radially flexible rings 2 of FIG. 3 may be assembled and the elements have now the important inner faces 60, which will have to be sealed. The elements 1,11 further get the clamping bearing portions 33 on the axially rear radial outer portions of the elements 1,11 to be set into the clamping portions 42 of the clamping rings 27,28 of FIG. 8.

FIG. 8 illustrates an example of a complete arrangement of the invention which commonly acts as a high pressure pump, for example, also for pumping of non-lubricating or of corroding fluid like water etc. The pumping chamber 50 is provided between the elements 1 and 11 of FIG. 7. The clamping rings 27 and 28 are clamped strongly together by bolts 30. However, the invention discovered that the clamping rings of the former art still had large friction between the clamping segments of the rings and the elements. Therefore, in order to eliminate this additional friction of the former art, the present invention provides the ring grooves 29 in the clamping rings 27 and 28 in order to form the radially flexible holding ring portions 42 of the invention, which now face the holding faces 33 of elements 1,11 of FIG. 7 and thereby fasten, keep and hold the symmetrically arranged elements 1 and 11 together. At the radial expansion and contraction 16 of FIG. 2 the ring portions 42 of the invention follow the movement 16 of the elements 1,11 and the mentioned additional friction of the former art is thereby eliminated. An additional, oppositionally directed additional ring groove 37 may be provided to form an additional radially flexible ring portion 32 on the clamping rings 27 and 28. The later FIG. 11 will, however, show that such an additional ring groove 37 may soften the strength of the clamping rings and may be spared or eliminated. The head cover 6 is provided with the inlet valve 69 and the outlet valve 70, as known in the art. The drive piston 66 is axially moveably provided in drive cylinder 67. Fluid under pressure is periodically alternatingly led through connection passage 46 into the bottom 68 of cylinder 67 to press the piston 66 periodically up and let it periodically move down, thereby periodically alternatingly compressing and expanding the elements 1 and 11. The supply of fluid through passage 46 and its fluid flow out in periodic cycles may be provided as in the mentioned former art of the same inventor.

FIG. 8 contains in addition the following novel arrangements and provisions of the present invention:

The passage 76 leads from the bottom of the inlet valve to the outlet valve in order to let any air or gas which might collect below the inlet valve escape through the outlet valve to prevent the collection of efficiency limiting air in the device. Similarly the passage 77 leads the air out of ring groove 48. The sending out of air occurs automatically because the passages 76 and 77 are set at the highest places where the air, which is lighter than the pumped liquid, would automatically collect. The clearances 47 are provided between the rings 2 and the insert 106 below head cover 6 in order to permit the radial movement 17 of the rings 2. A very important novel arrangement of the invention is the provision of radially flexible seal bearer lips or seal lips 22 on the piston 66 and the insert 106 below the cover 6. The seal lips 22 are formed by the provision of the ring grooves 48. The fluid from pumping chamber 50 enters into grooves 48 radially inwards of the seal lips 22 and thereby presses the seal lips 22 radially outwards under the pressure of fluid from the inside and thereby presses the seal lips or its seal lip corners against the inner faces 60 of elements 1 and 11. The inner faces 60 were seen in FIG. 6. The dimensioning of the radial wall thickness of the seal lips 22 and of the axial lengths of them which are defined by the depths of the grooves 48 are important parameters to make the radial movement of the seal lips and thereby the seal on the inner faces 60 of elements 1,11, effective. The chamber 50 is then effectively sealed. For pumping of corroding fluid of high pressure, the elements 1,11 and the seal lips 22 are made often by VEW stainless steel, by US steel 17PHc.H. or by the Japanese stainless steel SUS 630. At a perfect design the seal lips 22 may seal effective on elements 1,11. In other cases and in most practical applications, flexible seal rings are inserted into seal ring grooves 49 on the seal lips 22 to meet the seal lips and the elements to seal between them.

In FIG. 9 the clamping rings 27,28 of FIG. 8 are replaced by a board ring 80, which axially embraces the ring elements 1 and 11 axially from outside by boards 86,87 and keeps them together. The arrangement of a board ring 80 is not new, but known in the art, while, however, the insertion of the centering rings 20 of FIG. 7 and the provision of the portions 12 on the elements to meet at planes 23 is a novel arrangement and provision of the present invention.

Figure 10:
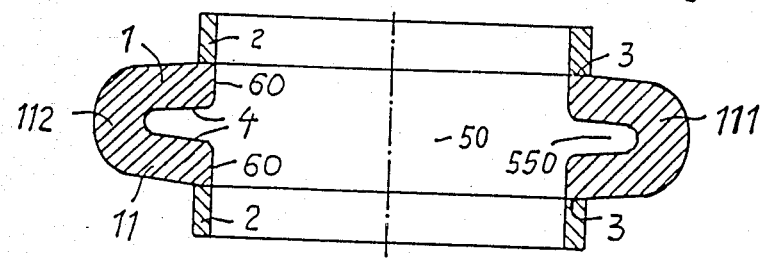

FIG. 10 shows another important provision of the present invention, namely the U-element 112. It combines two tapered ring portions, and thereby the symmetrically arranged elements 1 and 11 connected together by the outer, arched, portion 111. The eleent 112 is thereby a "one piece" or integral double element 1,11. It is produced from a bar or pipe by lathing the outcuts 550 from radially inside into the element 112. In case of plastic elements, the groove 550 is otherwise formed. This U-element of the invention combines simplicity with reliability. The radially flexible portions 2 may be provided on the axial ends of the elements 112 and, if two of the elements 112 are laid axially together, a seal lip bearer portion may be inserted into the inside to meet and seal neighboring inner faces 60 of two neighboring U-elements 112.

Figure 11:
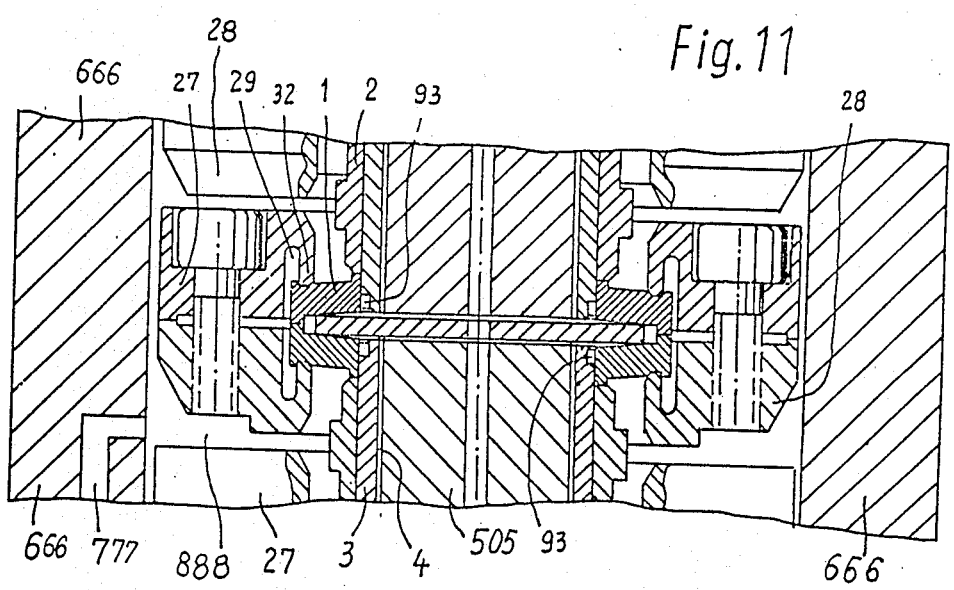

FIG. 11 shows that the clamping rings 27,28 have only grooves 29 and holding ring portions 32 in this embodiment but not the ring grooves 37 of FIG. 8. The week portions 32 of FIG. 8 are thereby eliminated. For low pressure devices the arrangement of FIG. 8 may be preferred while for high pressure devices the clamping rings of FIG. 11 are commonly used. The Figure also shows that a housing 666 should surround the entire arrangement in order to keep the head cover 6 and the cylinder 67 of FIG. 8 together.

An important novelty and provision by this embodiment of the invention is that a passage 777 may be provided in the housing 666 or at any other suitable place to lead a fluid under pressure into the interior space 888 of housing 666 in order to have a pressure in the interior space 888 which surrounds the clamping rings and elements. The elements are then subjected to the pressure in space 888 from the outside and to the pressure in chambers 50 from the inside. By providing a second pressure in space 888 the pressure in pumping chambers 50 can become increased, because the elements 1,11 work under a specific difference of pressures from inside and outside before they break under the pressure. The provision of passage 777 to lead fluid under pressure from a respective source of pressure into the interior, but sealed, space 888, can thereby easily double the pressure in pump chambers 50, for example, from 1000 to 2000 atmospheres, from 2000 to 4000 atmospheres, or the like, if the second pressures in space 888 are the 1000 or the 2000 atmospheres in the mentioned samples of pressure. The Figure also shows that upper and lower sets of clamping rings and elements may be provided above and below a respective set in order to operate a plurality of sets of FIG. 7 axially of each other for obtaining a higher quantity of delivery volume.

Figure 12:
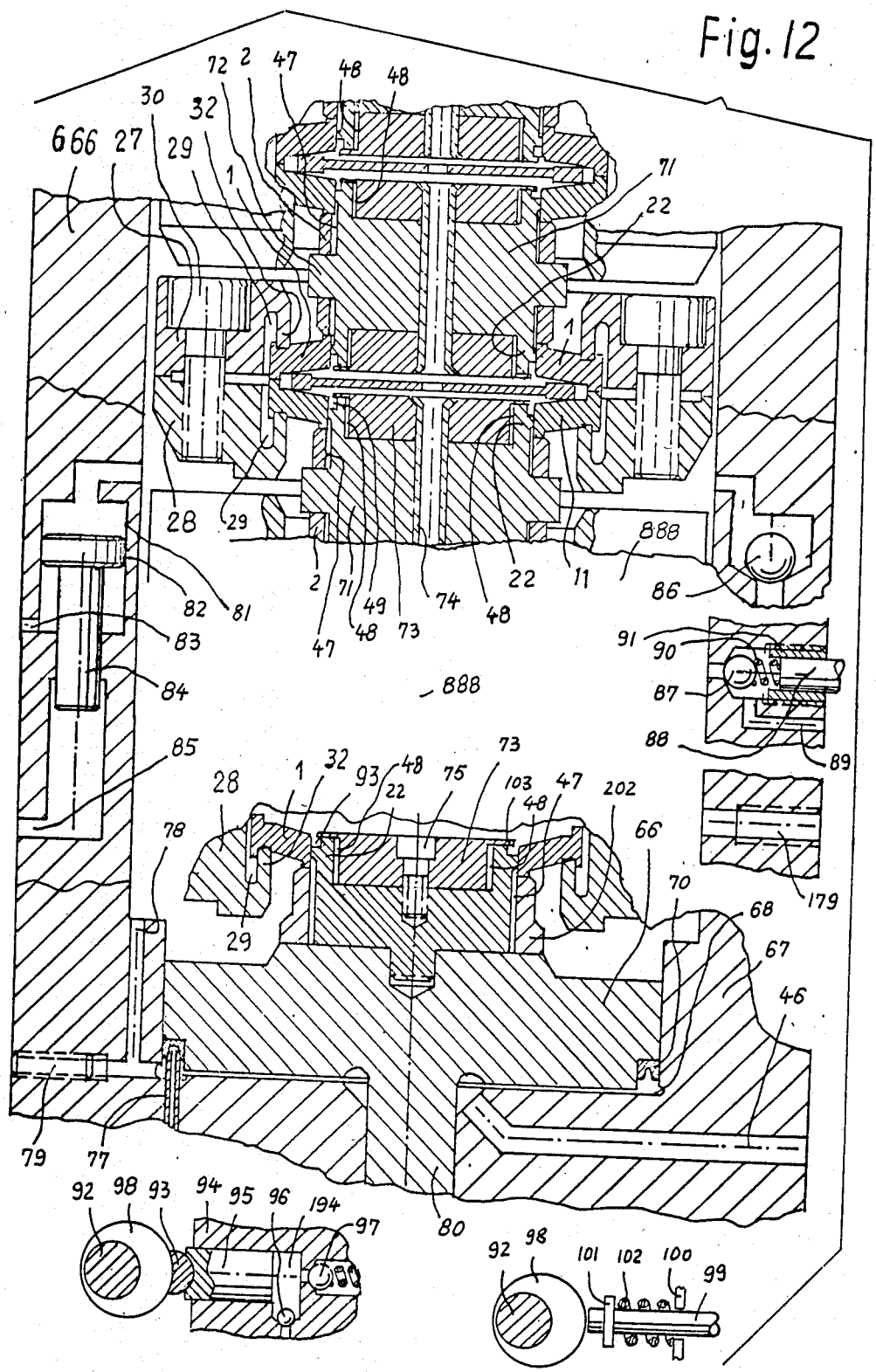

FIG. 12 illustrates again the housing 666 with pumping arrangements with clamping rings and elements therein. Since they are already known from FIGS. 6 to 8 and 11, they are not repeated in the description of FIG. 12. Passage 46 leads the alternating drive fluid into and out of cylinder 68 to operate the reciprocation of drive piston 66 while seal 68 seals between the mentioned cylinder 67 and piston 66. A pipe 77 may be provided to take automatically, or manually operated, the air out of the seal groove or seal 70. Fluid under second pressure may be supplied through passage 79 into the interior space 888 in housing 666. Alternatively pressurized fluid may be supplied through passage 179. Passage 179 may also serve alternatively as a connector for control of the pressure in space 888 in housing 666. Passage 78 may be provided and meet passage 79 in order to have a port at a specific height or location in or on space 888 in housing 666. Pressure control means and timed fluid or fluid pressure supply means may be added to the space 888 in housing 666 as, for example, by the following alternative arrangements:

Cylinder 81 may have axially moveable therein piston 82 with piston shaft 84 communicating to passages 83 and/or 85 at the specific locations; valve 86; valve 87 with spring 90, piston 88, adjuster or guider 91 and/or passage 89; or other suitable fluid pressure supply and control means. The passages 46, 79,179 or others may be communicated to exterior fluid handling chambers, like, for example, cylinder 194 in housing 94. Piston 95 running with its piston shoe 93 along the eccentric outer face of cam 98 of shaft 92 may then send fluid through the medial passage 46 between cylinders 194 and 68 into and out of cylinder 68. The piston 95 is then the primary piston or "giver piston" while piston 66 is then the secondary or "following piston" of the reciprocating fluid column between and in primary cylinder 194 and secondary cylinder 66. In such case no valve 97 is used.

In other cases or provisions, the chamber 194 may be used as a pumping chamber and then have inlet valve 96 and outlet valve 97. The shaft with the eccentric cam 98 may also be used to drive a control piston 99 and let it return under the spring 102 between the retainers 100 and 101 on piston 99 and a stationary portion 100. The mentioned shafts 92 with cams 98 can be utilized for the handling or control of pumping arrangements of the invention and of the Figures thereof, particularly, if they are suitably dimensioned respective to the parts or portions with which they are associated for cooperation. The pistons 95,99 and 66 are not in scale in FIG. 12. It may be noted, however, that the primary pistons like 95 commonly have much smaller diameters but longer strokes than the secondary pistons 66 since the following pistons commonly in high pressure divices of the invention act against many tons of force while the primary, giver pistons are limited in axial load by the bearings of the revovling shafts 92.

Details of examples of structure and function of the control of flow of fluid to and from cylinders 66 can be obtained from my parental application Ser. No. 387,567, now U.S. Pat. No. 4,569,630.

For the mentioned high pressure of more than 1000 atmospheres the element 1 of FIG. 6 (and of FIGS. 7 to 9, and 11, 12) has a large axial thickness relative to its radial cross sectional length and a very small angle of coned inclination. Insofar it differs drastically from bellows or disc springs of the prior art. The design of such elements for the mentioned very high pressure requires an intensive study of the equations and contents of FIGS. 23 and 24 of the mentioned parental application Ser. No. 387,567; now U.S. Pat. No. 4,569,630. The elements 1,11 of FIGS. 6 to 8 are about in scale at least regarding the relation of axial thickness to radial cross sectional length at pressure of 1500 atmospheres in chamber 50 inside of the mentioned elements if the pressure outside of the elements is about zero. The inclination of the face 4 (FIG. 6) relative to the bottom line of FIG. 6 (see referential number 13) is about 1.6 degrees for a life time of thirty milllion strokes of the element of FIG. 6 if the element is made of the mentioned steels. The actual stroke of compression of the element was 0.2 mm at the tests of the pump during 1985, while the inner diameter was 60 mm and the outer diameter was 89 mm. The axial thickness of the element was at some of them 6 mm and at others of them 7 mm.

What is claimed is:

1. A pump including a fluid containing chamber (50) provided with inlet and outlet valves (69,70) and formed between at least one hollow coned ring element (1,11) and at least one closing wall portion (6,7,66,1,11) with said hollow coned ring and said chamber subjected to periodic axial compression and expansion by an arrangement which includes a reciprocating piston 66 which at least indirectly meets at least one of said coned rings and subjects said coned rings and said chamber to said compression and expansion with an improvement, wherein said improvement consists in the provision of a pair of said hollow coned ring elements (1,11) with said coned rings symmetrically arranged around a common axis to form between said hollow coned rings said chamber (50) with a clamping ring arrangement provided radially outwards of said coned ring to fasten the radial outer ends of said coned rings together, wherein said clamping rings (27,28) form radially flexible ring shaped portions (42) radially inwards of circular ring grooves (29) to meet with the holding faces of said portions (42) clamping faces (33) on the radial outer ends of said coned rings (1,11); and, wherein said coned rings (1,11) are provided with axially towards the other of said rings (1,11) directed outer axial extensions (12) with said extensions (12) formed with bearing faces (13) which meet each other in a bearing face pair (23), while a centering ring (20) meets the radial inner faces of said extensions (12) to center said coned rings (1,11) on each other while a seal ring (26) is provided raidally inwards of said centering ring (20) to seal said chamber (50).

2. A pump comprising, in combination, a fluid containing working chamber (50) with inlet and outlet valves (69,70) formed between at least one hollow coned ring element (1,11) and at least one closing wall portion (6,7,66,1,11) with said hollow coned ring and said chamber subjected to periodic axial compression and expansion by an arrangement which includes a reciprocating piston (66) which at least indirectly subjects said coned ring and thereby said working chamber to periodically alternating compression and expansion, wherein an improvement is provided and said improvement comprises, in combination, a substantially cylindrical inner face (60) on said coned ring element (1,11), wherein said working chamber extends partially axially into the interior radially inside of said coned ring element and subjects said coned ring element to high pressure fluid radially inwards of a portion of said inner face whereby said coned ring element is subjected to deformation in the radial outward direction, wherein a seal lip portion (22), inserted into said interior is provided with a seal lip (22) and an inner space (48) radially inwards of said seal lip portion with said inner space communicating to said working chamber, and, wherein said seal lip is provided on the axially outermost portion of said seal lip portion and located close to the axially innermost end of said inner face of said coned ring element to meet and seal said inner face substantially on said axially innermost end, whereby said improvement further provides, in combination, (a) a sealing arrangement for said inner face close to said axial inner end of said inner face and thereby a separation device to separate the portion of said inner face which is subjected to high pressure from the other portion of said inner face to free said other portion from said high pressure and thereby to limit the extent of radial expansion of said ring element under said pressure, and;

(b) an ability of said seal lip of said seal lip portion to follow said radial expansion and contraction of said inner face at times of said compression and expansion of said chamber by which said ability secures the maintenance of sealing of said inner face at said expansion of said coned ring element.

* * * * *